D. BOOKER.
Pruning Implement.
No. 221,769.        Patented Nov. 18, 1879.
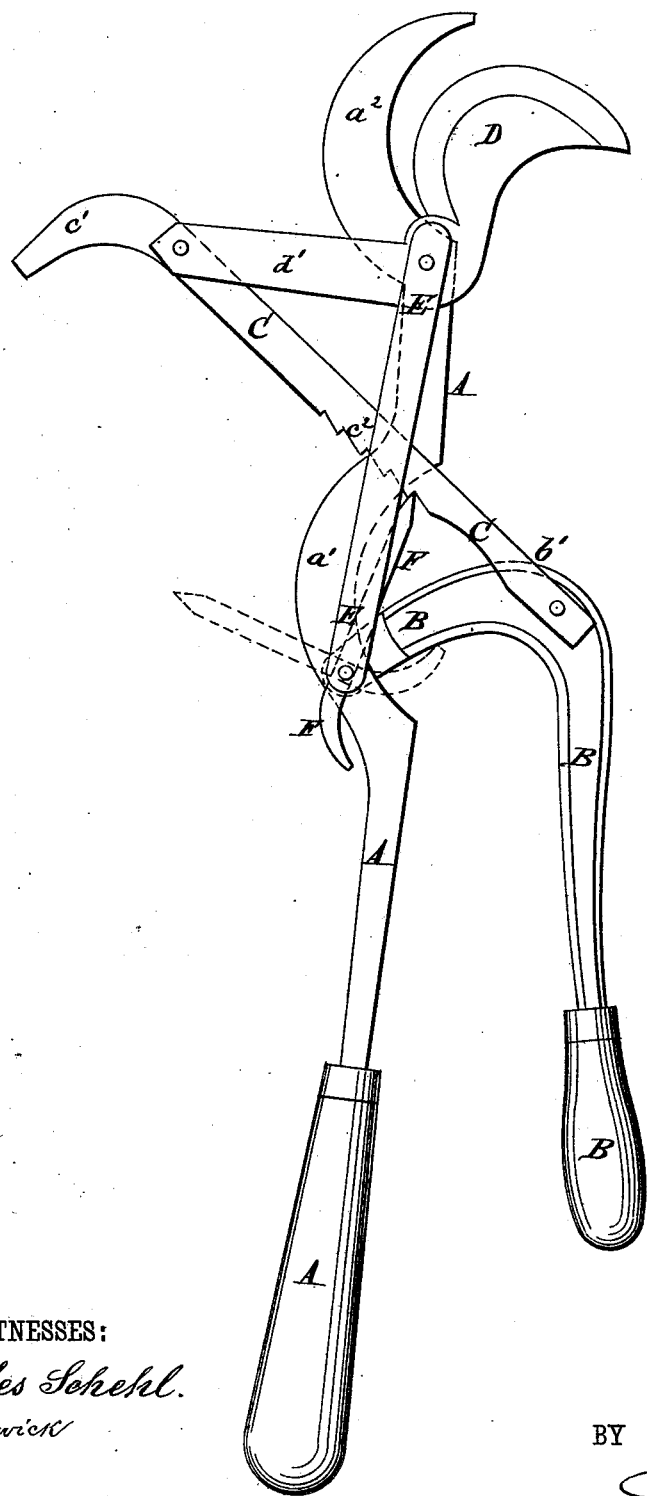

UNITED STATES PATENT OFFICE.

DAVID BOOKER, OF EDOM, TEXAS, ASSIGNOR TO HIMSELF AND FRANCES A. MAYS, OF SAME PLACE.

IMPROVEMENT IN PRUNING IMPLEMENTS.

Specification forming part of Letters Patent No. 221,769, dated November 18, 1879; application filed August 23, 1879.

*To all whom it may concern:*

Be it known that I, DAVID BOOKER, of Edom, in the county of Vanzandt and State of Texas, have invented a new and useful Improvement in Hedge-Cutters, of which the following is a specification.

The figure is a side view of my improved hedge-cutter.

The object of this invention is to furnish an improved implement for trimming hedges and for cutting and laying down hedges, which shall be simple in construction and effective in use.

The invention consists in a hedge-cutter formed by the combination of the lever provided with the curve and the hook, the lever provided with the bend, the pivoted bar provided with the hook and the notches, the cutter provided with the shank or arm, the brace-bar, and the stop-pawl with each other, as hereinafter fully described.

A is the main lever, which has a bend or curve, $a'$, formed in its middle part, and a hook, $a^2$, formed upon its forward end. B is the operating-lever, which has a bend, $b'$, formed in it near its upper end, to bring the said end into proper position to be pivoted to the main lever A at the lower part of its bend $a'$.

To the lever B at its bend is pivoted the lower end of the bar C, which has a hook, $c'$, formed upon its upper end.

To the bar C, near the hook $c'$, is pivoted the end of the shank or arm $d'$ of the cutter D.

The cutter D projects at an angle from the shank or arm $d'$, to bring it into proper position with reference to the hook $a^2$, and its cutting-edge is curved or convexed to correspond with the curve of the said hook $a^2$. The cutter D is pivoted at its base to the lever A at the base of the hook $a'$, and the implement is strengthened by the brace-bar E, the upper end of which is secured in place by the pivot that pivots the cutter D to the lever A.

The lower end of the brace-bar E is secured in place by the pivot that pivots the end of the lever B to the lever A.

F is a stop-pawl, which is pivoted to the pivot that pivots the end of the lever B to the lever A. The lower end of the pawl F projects to serve as a handle for adjusting it.

The upper part of the pawl F is made of such a length as to engage with notches $c^2$ in the edge of the bar C, to stop the movement of the blade D when the hedge-plant has been cut sufficiently to allow it to be laid down.

When the improvement is used for trimming a hedge the pawl F is turned back or into the first notch in the bar C, and the implement is then used in the same way as an ordinary hedge-trimmer. In using the implement for cutting and laying hedges, the pawl F is adjusted into that notch that will allow the cut to be made to the desired depth, and the plant after being cut is drawn and laid by means of the hook $c'$ of the bar C.

Having thus fully described my invention, I claim as new and desire to secure by Letters Patent—

A hedge-cutter formed by the combination of the lever A, provided with the curve $a'$ and the hook $a^2$, the lever B, provided with the bend $b'$, the pivoted bar C, provided with the hook $c'$ and the notches $c^2$, the cutter D, provided with the shank or arm $d'$, the brace-bar E, and the stop-pawl F, with each other, substantially as herein shown and described.

DAVID BOOKER.

Witnesses:
J. R. THOMAS,
R. A. SEAY.